(12) United States Patent
Chang (10) Patent No.: US 8,253,406 B2
(45) Date of Patent: Aug. 28, 2012

(54) SWITCHING VOLTAGE REGULATOR

(75) Inventor: Shao-Te Chang, Yilan County (TW)

(73) Assignee: Anpec Electronics Corporation, Hsinchu Science Park, Hsin-Chu (TW)

( * ) Notice: Subject to any disclaimer, the term of this patent is extended or adjusted under 35 U.S.C. 154(b) by 460 days.

(21) Appl. No.: 12/687,105

(22) Filed: Jan. 13, 2010

(65) Prior Publication Data

US 2011/0089918 A1    Apr. 21, 2011

(30) Foreign Application Priority Data

Oct. 19, 2009   (TW) ............................... 98135249 A (51) Int. Cl.
  *G05F 1/40*  (2006.01)
  *G05F 1/56*  (2006.01)
(52) U.S. Cl. .................... 323/285; 323/283; 323/288
(58) Field of Classification Search .............. 323/282, 323/283, 285, 288
  See application file for complete search history.

(56) References Cited

U.S. PATENT DOCUMENTS 7,567,070 B2 *   7/2009   Djenguerian et al. ........ 323/285
7,812,585 B2 *  10/2010   Zhou et al. ................... 323/284

* cited by examiner

*Primary Examiner* — Matthew Nguyen
(74) *Attorney, Agent, or Firm* — Winston Hsu; Scott Margo (57) ABSTRACT

A switching regulator comprises a sensing module for sensing an input current of the switching regulator to generate a sensing current, a switch module for determining whether an input end is electrically connected to an output end, a first comparator for comparing a feedback signal and a reference voltage to generate a first comparison result, a compensation module for providing a compensation signal, a sawtooth wave generator for generating a sawtooth wave signal according to the sensing current, a second comparator for comparing the sawtooth wave signal and the compensation signal to generate a second comparison result, a third comparator for comparing the sawtooth wave signal and the first comparison result to generate a third comparison result, and a logic module for generating a switching signal according to the second and the third comparison results.

23 Claims, 4 Drawing Sheets

SWITCHING VOLTAGE REGULATOR

BACKGROUND OF THE INVENTION

1. Field of the Invention

The present invention is related to a switching voltage regulator, and more particularly, to a switching voltage regulator capable of fixing a floating threshold of a load current.

2. Description of the Prior Art

In order to prevent disturbances induced by a voltage source from influencing an electronic device, circuit designers usually install voltage regulators between the voltage source and the electronic device, to stabilize a voltage supplied by the voltage source, so as to output the voltage at a level conforming to a designated level for the electronic device. In general, voltage regulators can be divided into two categories: linear and switching. A linear regulator stabilizes its output voltage by controlling a current between a voltage source and a load. Accordingly, in a switching regulator, a current between a voltage source and a load is not continuous but composed by discrete current impulses. To generate the current impulses, a switch, such as a power transistor, is installed between the voltage source and the load of the switching regulator. As a result, the switching regulator can convert the current impulses into a stable load current through inductor components embedded at an output end of the switching regulator.

Figure 1:
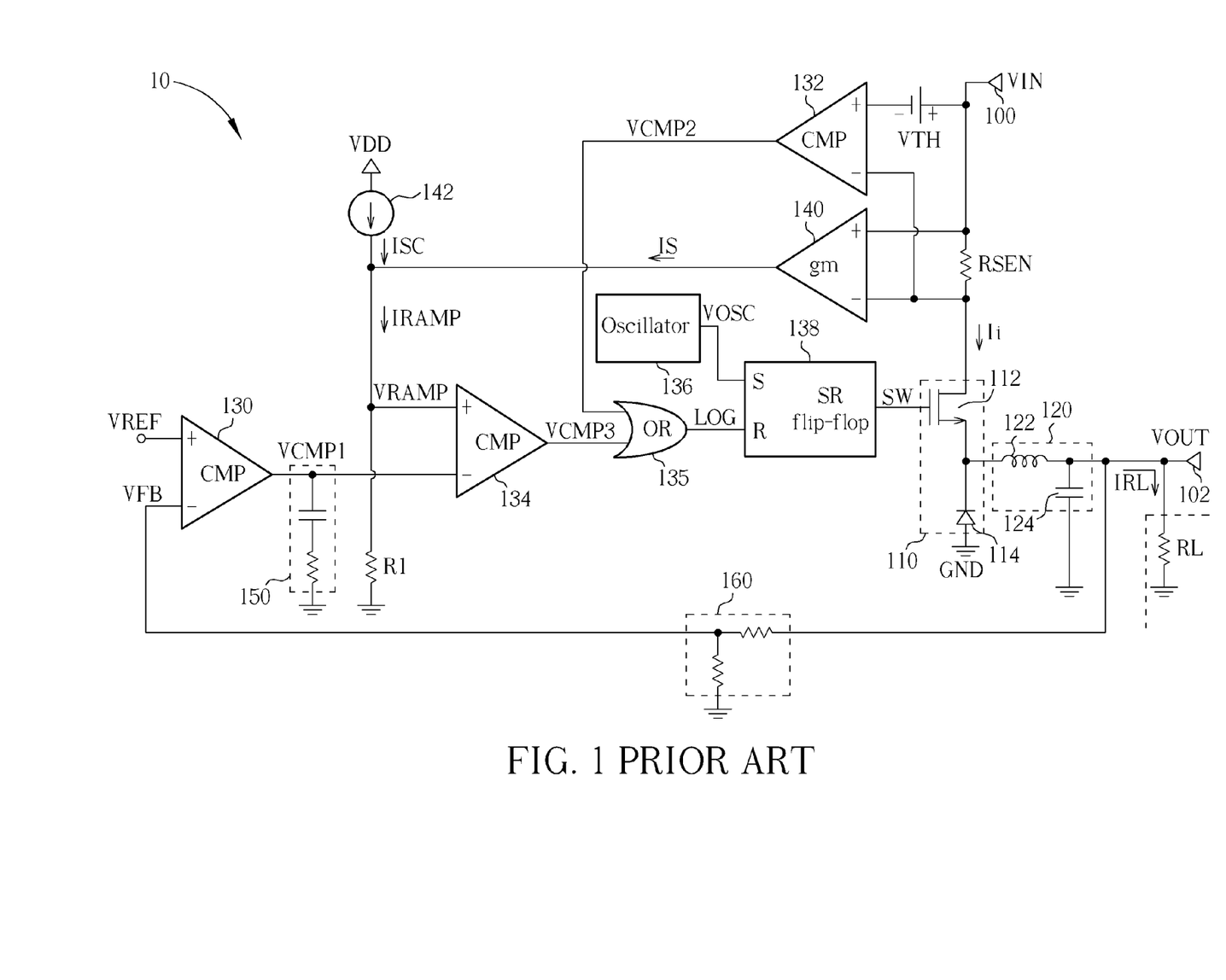
FIG. 1 is a schematic diagram of a switching regulator of the prior art.

Please refer to FIG. 1, which is a schematic diagram of a switching regulator 10 of the prior art. The switching regulator 10 is utilized for converting an input voltage VIN into a stable output voltage VOUT sent to a load RL. The switching regulator 10 mainly includes an input end 100, an output end 102, a switch module 110, an output module 120, a first comparator 130, a second comparator 132, a third comparator 134, an OR gate 135, an oscillator 136, a set-reset (SR) flip-flop 138, a transconductance amplifier 140, a compensation current source 142, a filter module 150 and a feedback module 160. The input end 100 is utilized for receiving the input voltage VIN. The transconductance amplifier 140 detects a variance of a voltage difference between two ends of a sensing resistor RSEN, to generate a sensing current IS. The compensation current source 142 is utilized for providing a compensation current ISC. A sum of the sensing current IS and the compensation current ISC can be regarded as a sawtooth wave current IRAMP, which generates a sawtooth wave signal VRAMP at a "+" input end of the third comparator 134. The feedback module 160 divides the output voltage VOUT to generate the feedback signal VFB. The first comparator 130 compares the feedback signal VFB and a reference voltage VREF to generate a first comparison result VCMP1. The filter module 150 then filters the first comparison result VCMP1. The third comparator 134 compares the sawtooth wave signal VRAMP and the first comparator result VCMP1, to generate a third comparison result VCMP3. In addition, the second comparator 132 compares a voltage VIN-VTH with a voltage of a "−" end of the transconductance amplifier 140, to generate a second comparison result VCMP2. The OR gate 135 performs a logic OR operation on the second comparison result VCMP2 and the third comparison result VCMP3 to generate a logic result LOG. The oscillator 136 is utilized for providing an oscillation signal VOSC. The SR flip-flop 138 sets a switching signal SW to be a high potential level according to the oscillation signal VOSC, and resets the switching signal SW to be a low potential level according to the logic result LOG. The switch module 110 includes a power transistor 112 and a diode 114, such that the switching regulator 10 can determine whether the input end 100 is electrically connected to the output end 102 according to the switching signal SW. Finally, the output module 120 is utilized for generating the output voltage VOUT, and includes an output inductor 122 and an output capacitor 124.

In short, the switching regulator 10 operates in an "ON" period or an "OFF" period. In the "ON" period, the oscillation signal VOSC is at a high voltage level, and can set the switching signal SW to be the high potential level, so as to enable the power transistor 112. In such a situation, an input current Ii flows from the input end 100 via the power transistor 112 to the output module 120, to generate the output voltage VOUT. Inversely, in the "OFF" period, the SR flip-flop is reset since the input current Ii exceeds a default threshold or the output voltage VOUT exceeds a default threshold, such that the power transistor 112 is disabled and the diode 110 is forward biased. As a result, via the diode 110, the output inductor 122 can draw a load current IRL required by the load RL from a ground GND.

Note that, the switching regulator 10 has a natural shortcoming of being unstable when a duty cycle of the power transistor 112 exceeds 50%. Thus, other than traditional feedback schemes, the switching regulator 10 implements a slope compensation scheme by adding the compensation current source 142. Moreover, the switching regulator 10 further includes the second comparator 132 to achieve a constant load current threshold. However, since the input voltage VIN is a high voltage, the second comparator 132 must be capable of bearing high voltages. To do so, the second comparator 132 has to be implemented by larger circuit layout area and operate at a slower speed as compared to other components in the switching regulator 10, leading to a higher manufacturing cost.

Figure 2:
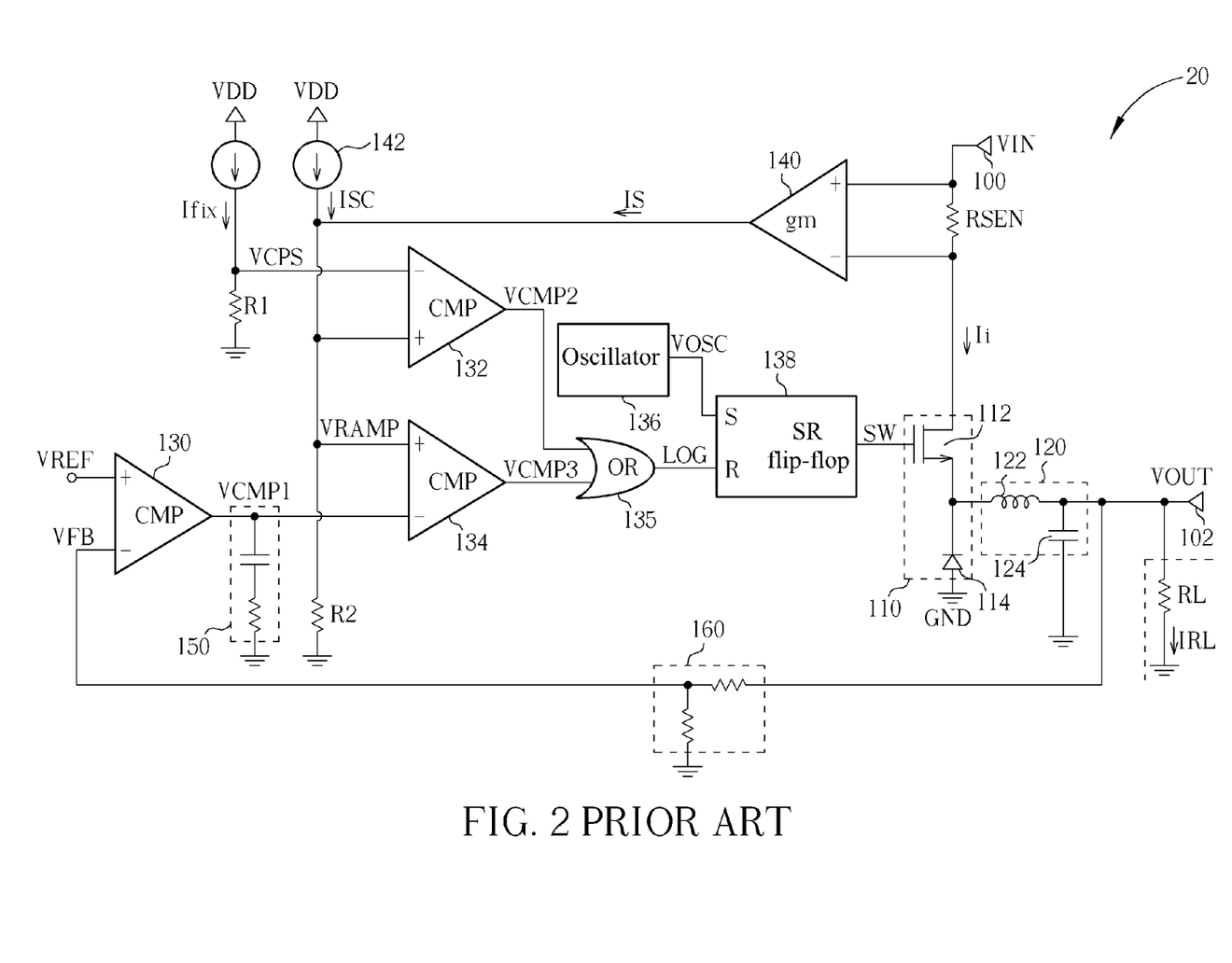
FIG. 2 is a schematic diagram of another switching regulator of the prior art.

Please continue to refer to FIG. 2, which is a schematic diagram of another switching regulator 20 of the prior art. The switching regulator 20 is similar to the switching regulator 10 except that a "+" input end of the second comparator 132 is coupled to the "+" input end of the third comparator 134, and a "−" input end of the second comparator 132 is coupled to a constant voltage signal VCPS in the switching regulator 20. As a result, the second comparator 132 no longer has to bear high voltages and can be implemented with a simpler architecture, to reduce the manufacturing cost and enhance operation speed.

However, in the switching regulator 20, when the load current IRL reaches a default threshold, VCPS=VRAMP, i.e. Ifix·R1=(ISC+IS)·R2. If the sensing current IS is divided into a time-variant component IS(t) and a constant component IS_fix (IS=IS_fix+IS(t)), and the compensation current ISC component is divided into a time-variant component ISC(t) and a constant component ISC_fix(ISC=/ISC_fix+ISC(t)), the time variant component of the sensing current IS(t) can be represented as:

$$IS(t) = Ifix \cdot \left(\frac{R1}{R2}\right) - \text{ISC\_fix} - \text{IS\_fix} - ISC(t). \quad \text{(Eq. 1)}$$

Moreover, based upon characteristics of the transconductance amplifier 140, the time-variant component of the sensing current IS (t) further can be represented as:

$$IS(t) = gm \cdot RSEN \cdot Ii(t) = gm \cdot RSEN \cdot IRL(t), \quad \text{(Eq. 2)}$$

where gm represents a transconductance gain of the transconductance amplifier 140, Ii(t) represents a time-variant component of the input current Ii, and IRL(t) represents a time-variant component of the load current IRL. Thus, if Eq. 1 is substituted into Eq. 2, the time-variant component of load current IRL(t) can be represented as:

$$IRL(t) = \frac{1}{gm \cdot RSEN}\left[Ifix \cdot \frac{R1}{R2} - \text{ISC\_fix} - \text{IS\_fix}\right] - \frac{1}{gm \cdot RSEN} \cdot ISC(t). \quad \text{(Eq. 3)}$$

In Eq. 3, the threshold of the load current IRL is not a constant but varies with the compensation current ISC. More specifically, the greater the compensation current ISC, the greater the chance that the threshold of the load current is lower than the designated threshold.

Therefore, how to implement the switching regulator without sacrificing stability and increasing manufacturing costs has been a major focus of the industry.

SUMMARY OF THE INVENTION

It is therefore a primary objective of the claimed invention to provide a switching regulator.

The present invention discloses a switching regulator, which comprises an input end for receiving an input voltage, an output end for outputting an output voltage, a sensing module coupled to the input end for sensing an input current of the switching regulator to generate a sensing current, a switch module coupled to the sensing module for determining whether the input end is electrically connected to the output end, an output module coupled between the switch module and the output end for generating the output voltage, a first comparator coupled to the output end for comparing a feedback signal of the switching regulator and a reference voltage to generate a first comparison result, a compensation module for providing a compensation signal, a sawtooth wave generator coupled to the sensing module for generating a sawtooth wave signal according to the sensing current, a second comparator coupled to the sawtooth wave generator and the compensation module for comparing the sawtooth wave signal and the compensation signal to generate a second comparison result, a third comparator coupled to the sawtooth wave generator and the first comparator for comparing the sawtooth wave signal and the first comparison result to generate a third comparison result, and a logic module coupled to the second comparator, the third comparator and the switch module for generating a switching signal according to the second comparison result and the third comparison result.

The present invention further discloses a switching regulator, which comprises an input end for receiving an input voltage, an output end for outputting an output voltage, a sensing module coupled to the input end for sensing an input current of the switching regulator to generate a sensing current, a switch module coupled to the sensing module for determining whether the input end is electrically connected to the output end, an output module coupled between the switch module and the output end for generating the output voltage, a first comparator coupled to the output end for comparing a feedback signal of the switching regulator and a reference voltage to generate a first comparison result, a constant voltage generator for providing a constant compensation signal, a mirror module coupled to the sensing module for generating a sensing voltage according to the sensing current, a sawtooth wave generator coupled to the sensing module for generating a sawtooth wave signal according to the sensing current, a second comparator coupled to the constant voltage generator and the mirror module for comparing the compensation signal and the sensing voltage to generate a second comparison result, a third comparator coupled to the sawtooth wave generator and the first comparator for comparing the sawtooth wave signal and the first comparison result to generate a third comparison result, and a logic module coupled to the second comparator, the third comparator and the switch module for generating a switching signal according to the second comparison result and the third comparison result to determine whether or not the switch module is enabled.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
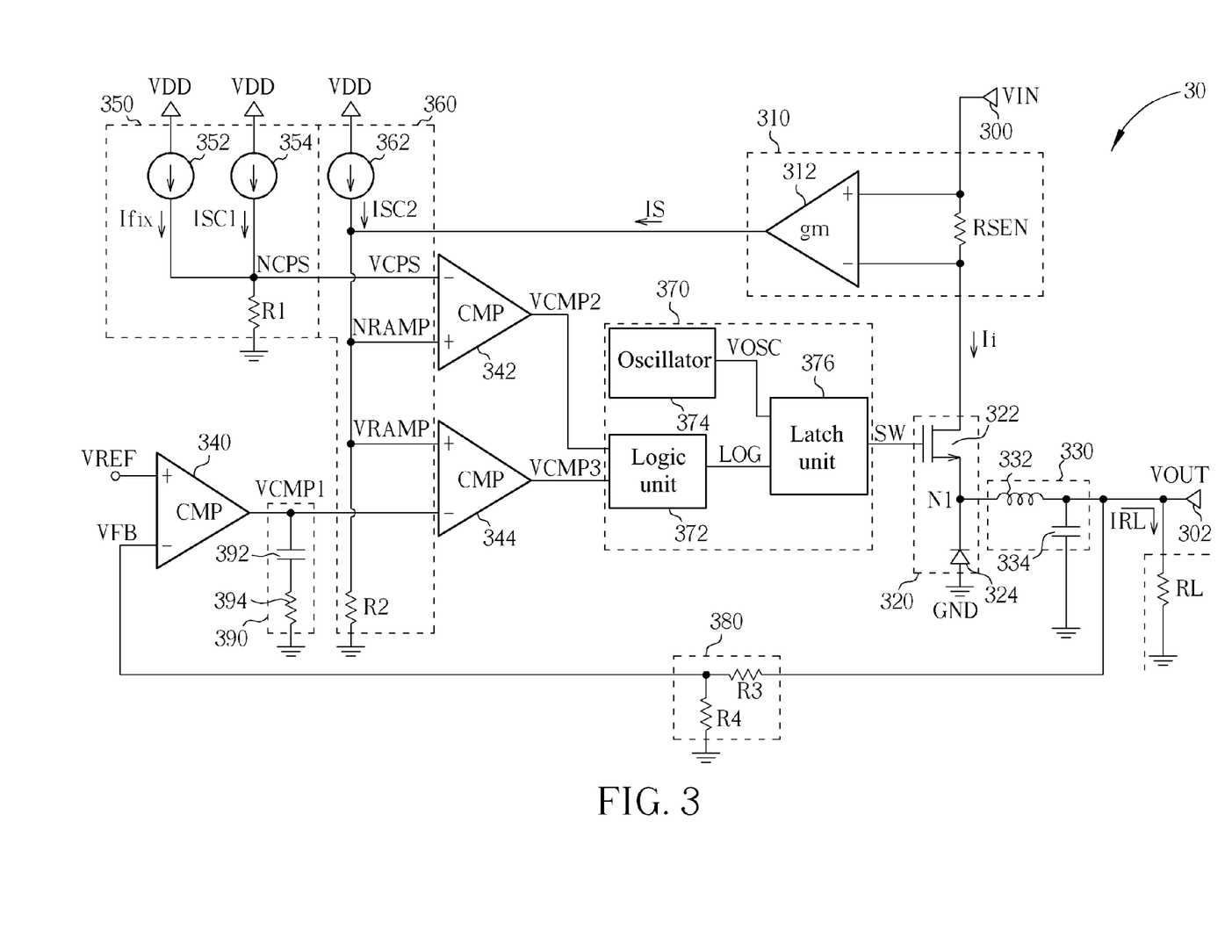
FIG. 3 is a schematic diagram of a switching regulator according to an embodiment of the present invention.

Please refer to FIG. 3, which is a schematic diagram of a switching regulator 30 according to an embodiment of the present invention. The switching regulator 30 includes an input end 300, an output end 302, a sensing module 310, a switch module 320, an output module 330, a first comparator 340, a compensation module 350, a sawtooth wave generator 360, a second comparator 342, a third comparator 344, a logic module 370 and a feedback module 380. The input end 300 is utilized for receiving an input voltage VIN from an external voltage source. The output end 302 is utilized for outputting an output voltage VOUT to a load RL. The sensing module 310 is utilized for sensing an input current Ii of the switching regulator 30 to generate a sensing current IS. The switch module 320 is utilized for determining whether the input end 300 is electrically connected to the output end 302. The output module 330 is utilized for generating the output voltage VOUT. The first comparator 340 is utilized for comparing a feedback signal VFB of the switching regulator 30 and a reference voltage VREF, to generate a first comparison result VCMP1. The compensation module 350 is utilized for providing a compensation signal VCPS. The sawtooth wave generator 360 is utilized for generating a sawtooth wave signal VRAMP according to the sensing current IS. The second comparator 342 is utilized for comparing the sawtooth wave signal VRAMP and the compensation signal VCPS, to generate a second comparison result VCMP2. The third comparator 344 is utilized for comparing the sawtooth wave signal VRAMP and the first comparison result VCMP1 to generate a third comparison result VCMP3. The logic module 370 is utilized for generating a switching signal SW according to the second comparison result VCMP2 and the third comparison result VCMP3, to determine whether or not to enable the switch module 320.

In short, in the switching regulator 30, the second comparator 342 is no longer directly coupled to the input end 300, such that the second comparator 342 can be implemented by low voltage components, so as to overcome shortcomings of the switching regulator 10 of the prior art. In addition, the switching regulator 30 provides the time-variant compensation signal VCPS by the compensation module 350 to prevent a threshold of the load current IRL from being floating because a slope compensation scheme is employed, so as to enhance stability of the switching regulator 30.

In detail, the compensation module 350 includes a constant current source 352, a first compensation current source 354, a first resistor R1 and a compensation node NCPS. The constant current source 352 and the first compensation current source 354 are respectively utilized for providing a constant current Ifix and a first compensation current ISC1. The first resistor R1 is utilized for generating the compensation signal VCPS according to the constant current Ifix and the first compensation current ISC1.

In addition, the sawtooth wave generator 360 includes a sawtooth wave node NRAMP, a second compensation current source 362 and a second resistor R2. The second compensation current source 362 is utilized for providing a second compensation current ISC2. The second resistor R2 is utilized for generating the sawtooth wave signal VRAMP at the sawtooth wave node NRAMP according to the sensing current IS and the second compensation current ISC2.

In order to sense the input current Ii, the sensing module 310 includes a sensing resistor RSEN and a transconductance amplifier 312. The transconductance amplifier 312 is utilized for amplifying a voltage difference between two ends of the sensing resistor RSEN to generate the sensing current IS sent to the sawtooth wave generator 360.

As a result, when the load current IRL reaches the threshold, VCPS=VRAMP, i.e. (ISC1+Ifix)·R1=(ISC2+IS)·R2. Preferably, if R1=R2 and ISC1=ISC2, then Ifix=IS. In such a situation, if the sensing current IS is divided into a time-variant component IS(t) and a constant component IS_fix (IS=IS_fix+IS(t)), the time-variant component IS(t) can be represented as:

$$IS(t)=Ifix-IS\_fix. \quad (Eq.\ 4)$$

In addition, according to characteristics of the transconductance amplifier 312, the time-variant component IS(t) further can be represented as:

$$IS(t)=gm \cdot RSEN \cdot Ii(t)=gm \cdot RSEN \cdot IRL(t), \quad (Eq.\ 5)$$

where gm represents a transconductance gain of the transconductance amplifier 312, Ii(t) represents a time-variant component of the input current Ii, and IRL(t) represents a time-variant component of the load current IRL. Thus, if Eq. 4 is substituted into Eq. 5, the time-variant component of load current IRL(t) can be represented as:

$$IRL(t)=\frac{Ifix-IS\_fix}{gm \cdot RSEN}. \quad (Eq.\ 6)$$

According to Eq. 6, a threshold of the load current IRL is a constant. In comparison with Eq. 3 derived based up the switching regulator 20 of the prior art, the threshold of the load current IRL is no longer variant with the compensation signal. That is, compared to the switching regulator 20, the switching regulator 30 is no longer affected by the slope compensation scheme, and achieves a constant threshold of the load current IRL. Therefore, the present invention can enhance stability of the switching regulator.

In addition, the logic module includes a logic unit 372, an oscillator 374 and a latch unit 376. The logic unit 372 is utilized for performing a logic operation on the second comparison result VCMP2 and the third comparison result VCMP3 to generate a logic result LOG. The oscillator 374 is utilized for providing an oscillation signal VOSC. Next, the latch unit 376 generates the switching signal SW based upon the logic result LOG and the oscillation signal VOSC. For example, preferably, the logic unit 372 can be an OR gate, and the latch unit 376 can be a set-reset (SR) flip-flop. As a result, the OR gate can perform a logic OR operation on the second comparison result VCMP2 and the third comparison result VCMP3, and the SR flip-flop can set the switching signal SW to be at a high potential level according to the oscillation signal VOSC and reset the switching signal SW to be at a low potential level according to the logic result LOG.

To determine whether the input end 300 is electrically connected to the output end 302, the switch module 320 includes a power transistor 322 and a diode 324. The output module 330 includes an output inductor 332 and an output capacitor 334. When the switching signal SW is at the high potential level, the power transistor 322 is enabled, and the diode 324 is reverse biased, such that the input current Ii can be supplied to the load RL via the power transistor 322 and the output inductor 332. When the switching signal SW alters to be at the low potential level, the power transistor 322 is disabled, and the diode 324 is forward biased since a current passing through the output inductor 322 is continuous, leading to an immediate voltage drop at a node N1 shown in FIG. 3, so as to draw the load current IRL from a ground end GND to the load RL and stabilize the output voltage VOUT.

Furthermore, the feedback module 380 preferably includes a third resistor R3 and a fourth resistor R4 for generating a divided voltage of the output voltage to be the feedback signal VFB. Certainly, based upon specific requirements, those skilled in the art can generate the feedback signal VFB by different methods, such as feeding back the output voltage VOUT without the dividing operation.

In order to enhance stability, the switching regulator 30 is preferably coupled to a filter module 390 at an output end of the first comparator 340. The filter module 340 is utilized for filtering the first comparison result VCMP1, and includes a filtering capacitor 392 and a filtering resistor 394, as illustrated in FIG. 3.

Certainly, the switching regulator 30 can be modified and varied by those skilled in the art based upon specific requirements. For example, please refer to FIG. 4, which is a schematic diagram of a switching regulator 40 according to an alternative embodiment of the present invention. The switching regulator 40 is similar to the switching regulator 30 except for an additional mirror module 400 and the removed first compensation current source 354. The mirror module 400 is utilized for generating a sensing voltage VSEN sent to a "+" end of the second comparator 342.

Figure 4:
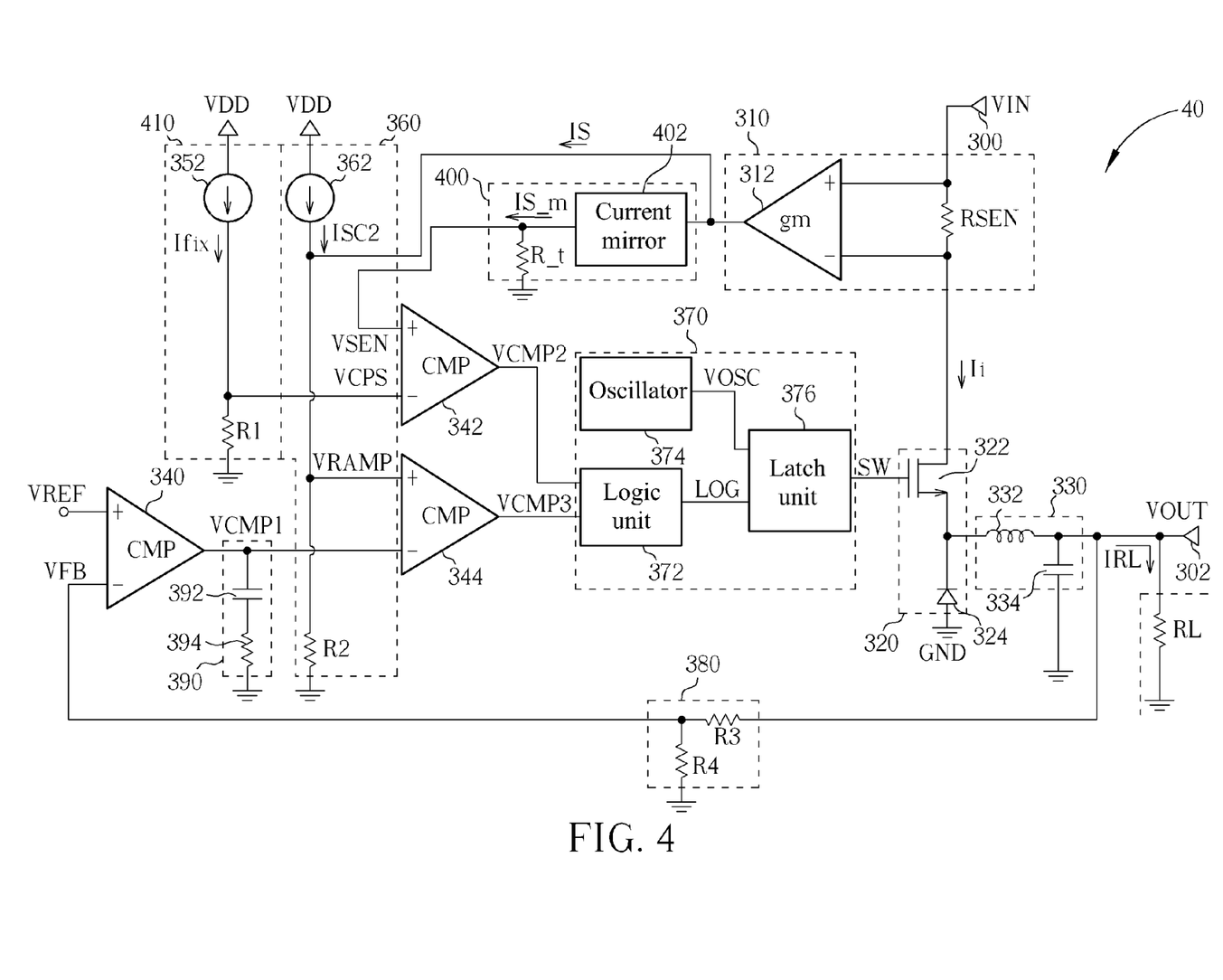
FIG. 4 is a schematic diagram of a switching regulator according to an alternative embodiment of the present invention.

In detail, the mirror module 400 includes a current mirror 402 and a conversion resistor R_t. The current mirror 402 is utilized for copying the sensing current IS to generate a duplicate sensing current IS_m. The conversion resistor R_t is utilized for converting the duplicate sensing current IS_m to the sensing voltage VSEN. Note that, since the first compensation current source 354 is removed, the compensation module 350 of the switching regulator 30 becomes a constant voltage generator 410 capable of providing the constant compensation signal VCPS to a "−" input end of the second comparator 342.

Therefore, when the load current IRL reaches the threshold, VCPS=VSEN, i.e. Ifix·R1=IS_m·R_t. If R1=R_t and IS_m=IS, Ifix=IS. Next, similarly, the sensing current IS is divided into the time-variant component IS(t) and the constant component IS_fix (IS=IS_fix+IS(t)), such that the time-variant component IS(t) can be represented as:

$$IS(t) = Ifix - IS\_fix. \tag{Eq. 7}$$

In addition, based upon characteristics of the transconductance amplifier 312, the time-variant component IS(t) further can be represented as:

$$IS(t) = gm \cdot RSEN \cdot Ii(t) = gm \cdot RSEN \cdot IRL(t) \tag{Eq. 8}$$

Finally, if Eq. 7 is substituted into Eq. 7, the time-variant component of load current IRL(t) can be represented as:

$$IRL(t) = \frac{Ifix - IS\_fix}{gm \cdot RSEN}. \tag{Eq. 9}$$

Eq. 9 is identical to Eq. 6. That is, the switching regulators 30, 40 have the same function of cancelling the floating threshold problem induced by the slope compensation scheme.

In the prior art, in order to maintain the constant threshold of the load current, the comparator 132 of the switching regulator 10 has to bear high voltages, and thus has to be implemented with a large circuit layout area. In addition, even though the switching regulator 20 of the prior art no longer has to employ the high voltage component, the threshold of the load current IRL of the switching regulator 20 is still variant with the compensation current ISC. In comparison, the present invention can cancel the floating threshold problem of the load current IRL induced by the slope compensation scheme by providing the extra second compensation current ISC2 (the switching regulator 30) or copying the sensing current IS (the switching regulator 30) without employing any high voltage components. Compared to the switching regulator 10, the switching regulators 30, 40 cost less and can operate at higher speeds. Compared to the switching regulator 20, the switching regulators 30, 40 can accomplish higher stability.

To sum up, the present invention cancels the floating threshold problem of the load current by providing the extra compensation current or copying the sensing current without employing any high voltage components.

Those skilled in the art will readily observe that numerous modifications and alterations of the device and method may be made while retaining the teachings of the invention.

What is claimed is:

1. A switching regulator comprising:
an input end, for receiving an input voltage;
an output end, for outputting an output voltage;
a sensing module, coupled to the input end, for sensing an input current of the switching regulator to generate a sensing current;
a switch module, coupled to the sensing module, for determining whether the input end is electrically connected to the output end;
an output module, coupled between the switch module and the output end, for generating the output voltage;
a first comparator, coupled to the output end, for comparing a feedback signal of the switching regulator and a reference voltage to generate a first comparison result;
a compensation module, for providing a compensation signal;
a sawtooth wave generator, coupled to the sensing module, for generating a sawtooth wave signal according to the sensing current;
a second comparator, coupled to the sawtooth wave generator and the compensation module, for comparing the sawtooth wave signal and the compensation signal to generate a second comparison result;
a third comparator, coupled to the sawtooth wave generator and the first comparator, for comparing the sawtooth wave signal and the first comparison result to generate a third comparison result; and
a logic module, coupled to the second comparator, the third comparator and the switch module, for generating a switching signal according to the second comparison result and the third comparison result.

2. The switching regulator of claim 1, wherein the compensation module comprises:
a compensation node, coupled to the second comparator;
a constant current source, coupled to the compensation node, for providing a constant current;
a first compensation current source, coupled to the compensation node, for providing a first compensation current; and
a first resistor, coupled between the compensation node and a ground end, for generating the compensation signal according to the constant current and the first compensation current.

3. The switching regulator of claim 1, wherein the sawtooth wave generator comprises:
a sawtooth wave node, coupled to the sensing module, the second comparator and the third comparator;
a second compensation current source, coupled to the sawtooth wave node, for providing a second compensation current; and
a second resistor, coupled between the sawtooth wave node and the ground end, for generating the sawtooth wave signal according to the sensing current and the second compensation current.

4. The switching regulator of claim 1, wherein the sensing module comprises:
a sensing resistor, comprising one end coupled to the input end and another end coupled to the switch module; and
a transconductance amplifier, coupled to the sensing resistor and the sawtooth wave generator, for amplifying a voltage difference between the two ends of the sensing resistor to generate the sensing current sent to the sawtooth wave generator.

5. The switching regulator of claim 1, wherein the logic module comprises:
a logic unit, coupled to the second comparator and the third comparator, for performing a logic operation on the second comparison result and the third comparison result to generate a logic result;
an oscillator, for providing an oscillation signal; and
a latch unit, coupled to the logic unit, the oscillator and the switch module, for generating the switching signal according to the logic result and the oscillation signal.

6. The switching regulator of claim 5, wherein the logic unit is an OR gate.

7. The switching regulator of claim 5, wherein the latch unit is a set-reset (SR) flip-flop, for setting the switching signal according to the oscillation signal and resetting the switching signal according to the logic result.

8. The switching regulator of claim 1, wherein the switch module comprises:
a power transistor, comprising a drain end coupled to the sensing module, a gate end coupled to the logic module, and a source end coupled to the output module, for determining whether or not the input end is electrically connected to the output end according to the switching signal; and
a diode, comprising an anode end coupled to the ground end and a cathode end coupled to the power transistor and the output module, for electrically connecting the ground end and the output module when the power transistor is disabled.

9. The switching regulator of claim 1, wherein the output module comprises:
an output inductor, comprising one end coupled to the switch module and another end coupled to the output end; and
an output capacitor, comprising one end coupled to the output end and the output inductor and another end coupled to the ground end.

10. The switching regulator of claim 1 further comprising a feedback module comprising:
a third resistor, comprising one end coupled to the output end and the output module and another end coupled to the first comparator; and
a fourth resistor, comprising one end coupled to the third resistor and the first comparator and another end coupled to the ground end.

11. The switching regulator of claim 1 further comprising a filter module utilized for filtering the first comparison result and comprising:
a filtering capacitor, comprising one end coupled between the first comparator and the third comparator; and
a filtering resistor, coupled between the filtering capacitor and the ground end.

12. A switching regulator comprising:
an input end, for receiving an input voltage;
an output end, for outputting an output voltage;
a sensing module, coupled to the input end, for sensing an input current of the switching regulator to generate a sensing current;
a switch module, coupled to the sensing module, for determining whether the input end is electrically connected to the output end;
an output module, coupled between the switch module and the output end, for generating the output voltage;
a first comparator, coupled to the output end, for comparing a feedback signal of the switching regulator and a reference voltage to generate a first comparison result;
a constant voltage generator, for providing a constant compensation signal;
a mirror module, coupled to the sensing module, for generating a sensing voltage according to the sensing current;
a sawtooth wave generator, coupled to the sensing module, for generating a sawtooth wave signal according to the sensing current;
a second comparator, coupled to the constant voltage generator and the mirror module, for comparing the compensation signal and the sensing voltage to generate a second comparison result;
a third comparator, coupled to the sawtooth wave generator and the first comparator, for comparing the sawtooth wave signal and the first comparison result to generate a third comparison result; and
a logic module, coupled to the second comparator, the third comparator and the switch module, for generating a switching signal according to the second comparison result and the third comparison result, to determine whether or not the switch module is enabled.

13. The switching regulator of claim 12, wherein the mirror module comprises:
a current mirror, coupled to the sensing module and the sawtooth wave generator, for copying the sensing current to generate a duplicate sensing current; and
a conversion resistor, comprising one end coupled to the current mirror and the second comparator and another end coupled to a ground end, for converting the duplicate sensing current to the sensing voltage.

14. The switching regulator of claim 12, wherein the constant voltage generator comprises:
a constant current source, coupled to the second comparator, for providing a constant current; and
a first resistor, comprising one end coupled to the constant current source and the second comparator and another end coupled to the ground end, for generating the compensation signal according to the constant current.

15. The switching regulator of claim 12, wherein the sawtooth wave generator comprises:
a sawtooth wave node, coupled to the sensing module and the third comparator;
a compensation current source, coupled to the sawtooth wave node, for providing a compensation current; and
a second resistor, coupled between the sawtooth wave node and the ground end, for generating the sawtooth wave signal according to the sensing current and the compensation current.

16. The switching regulator of claim 12, wherein the sensing module comprises:
a sensing resistor, comprising one end coupled to the input end and another end coupled to the switch module; and
a transconductance amplifier, coupled to the sensing resistor, the sawtooth wave generator and the mirror module, for amplifying a voltage difference between the two ends of the sensing resistor to generate the sensing current sent to the sawtooth wave generator.

17. The switching regulator of claim 12, wherein the logic module comprises:
a logic unit, coupled to the second comparator and the third comparator, for performing a logic operation on the second comparison result and the third comparison result to generate a logic result;
an oscillator, for providing an oscillation signal; and
a latch unit, coupled to the logic unit, the oscillator and the switch module, for generating the switching signal according to the logic result and the oscillation signal.

18. The switching regulator of claim 17, wherein the logic unit is an OR gate.

19. The switching regulator of claim 17, wherein the latch unit is an SR flip-flop, for setting the switching signal according to the oscillation signal and resetting the switching signal according to the logic result.

20. The switching regulator of claim 12, wherein the switch module comprises:
a power transistor, comprising a drain end coupled to the sensing module, a gate end coupled to the logic module and a source end coupled to the output module, for determining whether or not the input end is electrically connected to the output end according to the switching signal; and
a diode, comprising an anode end coupled to the ground end and a cathode end coupled to the power transistor and the output module, for electrically connecting the ground end and the output module when the power transistor is disabled.

21. The switching regulator of claim 12, wherein the output module comprises:
an output inductor, comprising one end coupled to the switch module and another end coupled to the output end; and an output capacitor, comprising one end coupled to the output end and the output inductor and another end coupled to the ground end.

22. The switching regulator of claim 12 further comprising a feedback module comprising:
   a third resistor, comprising one end coupled to the output end and the output module and another end coupled to the first comparator; and
   a fourth resistor, comprising one end coupled to the third resistor and the first comparator and another end coupled to the ground end.

23. The switching regulator of claim 12 further comprising a filter module utilized for filtering the first comparison result and comprising:
   a filtering capacitor, comprising one end coupled between the first comparator and the third comparator; and
   a filtering resistor, coupled between the filtering capacitor and the ground end.

\* \* \* \* \*